United States Patent [19]

Goller et al.

[11] 4,185,131

[45] Jan. 22, 1980

[54] SCREEN PRINTING METHOD FOR MAKING AN ELECTROCHEMICAL CELL ELECTRODE

[75] Inventors: Glen J. Goller, West Springfield, Mass.; Vincent J. Petraglia, Vernon; George Dews, Glastonbury, both of Conn.

[73] Assignee: United Technologies Corporation, Hartford, Conn.

[21] Appl. No.: 920,038

[22] Filed: Jun. 28, 1978

[51] Int. Cl.$^2$ ............... H01M 4/86; H01M 4/96
[52] U.S. Cl. .................... 427/113; 427/113; 427/115; 427/122; 427/125; 427/126; 427/282; 427/369; 429/42
[58] Field of Search ............. 429/42; 427/115, 122, 427/113, 126, 125, 369, 376 R, 264, 265, 282

[56] References Cited

U.S. PATENT DOCUMENTS

| | | | |
|---|---|---|---|
| 2,961,712 | 11/1960 | Davis | 427/115 |
| 3,080,258 | 3/1963 | Davis | 427/215 |
| 3,385,736 | 5/1968 | Delbert | 429/42 |
| 3,457,113 | 7/1969 | Delbert | 429/42 |
| 3,857,737 | 12/1974 | Kemp | 252/182.1 |
| 3,932,197 | 1/1976 | Katz | 204/180 R |
| 3,972,735 | 8/1976 | Breault | 252/182.1 |
| 3,979,227 | 9/1976 | Katz | 427/115 |
| 4,000,006 | 12/1976 | Trocciola | 427/115 |
| 4,001,042 | 1/1977 | Trocciola | 427/115 |
| 4,043,933 | 8/1977 | Breault | 252/180 |

*Primary Examiner*—Michael F. Esposito
*Attorney, Agent, or Firm*—Stephen E. Revis

[57] ABSTRACT

Fuel cell electrodes of uniform quality are made on a continuous basis using screen printing. A wet floc is first made by floccing a co-suspension of carbon and hydrophobic polymer. The floc is dried, reduced to a fine powder, and re-suspended in an inking vehicle. The ink is then screen printed onto a porous substrate and the inking vehicle is removed such as by heating. The layer is compacted, sintered, and then catalyzed such as with platinum.

10 Claims, No Drawings

SCREEN PRINTING METHOD FOR MAKING AN ELECTROCHEMICAL CELL ELECTRODE

BACKGROUND OF THE INVENTION

1. Field of the Invention

This invention relates to fuel cell electrodes and, more particularly, a method for making said electrodes.

2. Description of the Prior Art

Electrodes for use in electrochemical cells such as fuel cells are well known in the art. One common type of electrode is the gas diffusion electrode. A pair of gas diffusion electrodes are disposed on either side of a compartment containing a matrix which is soaked with electrolyte. A catalyst is disposed on the electrolyte facing surface of each electrode. Hydrogen is fed to the back side of one electrode while oxygen or air is fed to the back side of the other electrode. The gases enter the electrodes and react with the electrolyte in the presence of the catalyst.

Many types of gas diffusion electrodes are described in the literature. One type of gas diffusion electrode comprises a layer of polytetrafluoroethylene (PTFE) mixed with a catalyst supported on carbon particles (i.e., catalyzed carbon), said layer being disposed on the surface of a porous carbon substrate (e.g., carbon paper). The PTFE prevents the electrolyte from filling up the electrode to such an extent that sufficient fuel or oxidant cannot reach the catalyst. A gas diffusion electrode of this type is described in column 5 of commonly owned U.S. Pat. No. 3,857,737 to Kemp et al.

Another type of gas diffusion electrode comprises a carbon paper substrate with a layer of uncatalyzed carbon mixed with PTFE applied to the surface thereof; unsupported catalyst is then applied to the carbon/PTFE layer. An electrode of this type is described in commonly used U.S. Pat. No. 3,972,735 to Breault.

One technique for applying either the catalyzed carbon/PTFE layer or the uncatalyzed carbon/PTFE layer to a substrate is the direct filtration method. In that method carbon powder (catalyzed or uncatalyzed) and an aqueous PTFE dispersion are blended into an alcohol/water solution to form a co-suspension of carbon and PTFE therein. The suspension is caused to floc, such as by heating or adding a floccing agent. Floccing is the coalescence of the catalyzed or uncatalyzed carbon particles with the PTFE particles. A proper floc is one which achieves uniform size agglomerates of catalyzed or uncatalyzed carbon and PTFE particles and a homogeneous distribution or mix of the particles. After floccing, excess liquid is decanted and the floc is applied to the surface of a carbon paper substrate which acts as a filter. Liquids pass through the substrate and a layer of the desired solids mixture (i.e., the floc) remains on the surface of the substrate. The article is dried, compacted, and sintered. If the applied layer does not include catalyst, a separate catalyst application step would be required.

A related technique is the indirect filtration (or filter transfer) method wherein the layer of floc is applied to the substrate by first filtering it onto special filter paper instead of onto the carbon paper substrate. The layer is then transferred from the filter paper onto the carbon paper, dried, compacted, and sintered as in the direct filtration method.

In the aforementioned Kemp et al. patent it indicates in column 5 at lines 15-31 that a co-suspension of platinum catalyst (supported on carbon) and PTFE can be applied to a carbon paper substrate by screen printing. Despite this mention of screen printing in Kemp et al., no suitable screen printing method is described or is obvious from any art presently known to applicants. Two commonly owned patents which relate to screen printing the electrolyte retaining matrix onto the surface of an electrode are U.S. Pat. Nos. 4,000,006 and 4,001,042.

SUMMARY OF THE INVENTION

An object of the present invention is an improved method for manufacturing an electrochemical cell electrode.

Another object of the present invention is a method for making reproducible fuel cell electrodes on a continuous basis.

A more specific object of the present invention is a method for making fuel cell electrodes using screen printing techniques.

Accordingly, the present method for making an electrode comprises the steps of floccing a co-suspension of carbon particles and a hydrophobic fluorocarbon polymer; drying the floc and reducing it to a fine powder; resuspending the floc powder in an inking vehicle; screen printing the ink onto a porous substrate; removing the inking vehicle; compacting the applied floc layer; sintering the compacted article; and catalyzing the floc layer.

Our early efforts to screen print reproducible electrodes in a continuous process were not successful. For example, carbon powder and an aqueous suspension of PTFE were blended directly into an inking vehicle such as water plus a thickening agent. The ink was then screen printed onto the surface of a carbon paper substrate to form a layer of carbon and PTFE agglomerates which was subsequently dried to remove the inking vehicle, compacted, sintered, and catalyzed. Acceptable electrodes could not be made by this method. In the first place, the agglomerates of carbon and PTFE could not be kept well-dispersed in the inking vehicle for a long enough length of time to print more than two or three electrodes one right after the other. Also, all the electrodes which were made did not perform as well as prior art electrodes. The carbon/PTFE layer did not have the same characteristics as floc layers made by earlier successful techniques. This was perhaps the result of inadequate floccing of the electrode materials in the inking vehicle.

In an attempt to overcome these problems, a co-suspension of carbon and PTFE in an alcohol/water slution was prepared and flocced as described in connection with the filtration methods discussed above. An ink was then made by adding a thickener to the flocced mixture. The thickened dispersion was screen printed onto a carbon paper substrate to form a layer which was subsequently dried, compacted, sintered and catalyzed. The electrodes formed by this method also did not perform satisfactorily. Poor performance in this case was also attributed to an improper dispersion of the carbon/PTFE floc within the ink mixture. The addition of surfactants improved the dispersion, but not to the extent desired. Also, the surfactants tended to poison the catalyst, and from that point of view were undesirable. Furthermore, as with the previously described method, no more than a few electrodes could be printed before the screen would become clogged due to "gumming" of solids.

The process of the present invention eliminates the problems of the foregoing techniques. Surprisingly, it was found that if an alcohol/water dispersion of PTFE and uncatalyzed carbon is flocced in essentially the same manner as was done in the above-discussed filtration methods, and if that floc is dried and pulverized to a powder, the dry powder or floc can be readily and uniformly re-suspended and dispersed in a suitable inking vehicle and stays so dispersed for long periods of time (with only occasional mixing). Because the electrode material remains well dispersed in the inking vehicle, large numbers of electrode substrates can be screen printed with the ink in a continuous process without the screen becoming clogged. Also, the electrodes made using this method perform at least as well as electrodes made by earlier processes and are exceptionally reproducible. The one drawback of this method is that it is not suitable for use with precatalyzed carbon.

The foregoing and other objects, features, and advantages of the present invention will become more apparent in the light of the following detailed description of preferred embodiments thereof.

DESCRIPTION OF THE PREFERRED EMBODIMENTS

The process of the present invention comprises a series of step which may be broadly broken down as follows: (1) properly floccing a co-suspension of carbon particles and a hydrophobic fluorocarbon polymer; (2) drying the floc and forming it into a dry floc powder; (3) resuspending the dry floc powder in a suitable inking vehicle; (4) screen printing the ink onto a suitable substrate; (5) removing the inking vehicle thereby leaving a layer of the dry floc on the substrate; (6) compacting the floc layer; (7) sintering the structure so formed; and (8) catalyzing the floc layer. The term "sintering" as used above and hereinafter in the specification and claims means heating to a temperature sufficiently high and for a sufficient length of time to result in a bonding of the floc particles to each other and to the substrate, and to provide partial hydrophobicity to the floc layer. Temperatures should not be so high as to cause the polymer to degrade.

In the method of the present invention we prefer to use porous fibrous carbon paper as the substrate. A carbon paper substrate may be made for example, by carbonizing a fiber such as nylon or rayon by heating at about 1300°–1500° F. The carbonized fibers may then be cut to the desired length and made into paper by any one of the well known paper making processes. Carbon paper can be purchased from various manufacturers such as Union Carbide Co. and Kreha Corp. Typically the carbon paper is wetproofed such as by dipping it into an aqueous solution of PTFE or other suitable hydrophobic polymer, but this is not always required. The substrate does not form a part of the present invention per se.

The floc of the present invention may be any carbon/hydrophobic fluorocarbon polymer floc which can or has been successfully applied to electrode substrates by prior art techniques, such as by spraying, filtration, or spreading with a doctor blade. Carbon, as is used broadly herein and in the claims, is intended to include within its meaning graphite, acetylene black, carbon black, and any carbon which has been partially graphitized.

According to one embodiment of the present invention, a fuel cell electrode is prepared as follows:

Substrate Preparation

A porous carbon paper made from carbon fibers is impregnated with from 5.0–6.0 mg/cm$^2$ PTFE by dipping the carbon paper in a solution of TFE-30 containing 26% PTFE solids. TFE-30 is an aqueous dispersion of about 0.2 micron size PTFE particles with surfactant (Triton X100) manufactured by Dupont Co. The impregnated carbon paper is dried at 160°±10° F. for 25 minutes. It is then placed in a bath of isopropanol to leach out most of the surfactant. This leaching step is optional since the surfactant may be removed during later steps in the process. Finally, it is heated to 640° F. and held for 20 minutes.

Dry Floc Powder Preparation

Vulcite, a graphitized carbon made by heat treating a high surface area non-graphitized carbon (e.g., Vulcan XC-72, a carbon manufactured by Cabot Corporation), is air oxidized by thinly spreading the Vulcite on a sheet metal tray and heating in a preheated box furnace at 1000° F. for one and one-half hours. (The oxidizing step changes the surface chemistry of the carbon, making it easier to later disperse the carbon in the inking vehicle; however, this step, although preferred, is optional since satisfactory results can be obtained by using unoxidized Vulcite). The oxidized Vulcite is then mechanically made into a fine powder. Twelve grams of the powdered oxidized Vulcite is added to and blended into a solution comprising 4 ml of isopropanol in 250 ml of distilled water. 13.4 g of a 60% solids solution of TFE-3170 (an aqueous suspension of PTFE manufactured by Dupont Co.) is stirred into the Vulcite/water/isopropanol solution. An additional 250 ml of isopropanol is added and thoroughly blended. The mixture is now a uniform co-suspension of Vulcite (i.e., graphitized carbon) and PTFE. The solids are caused to floc by heating the co-suspension to 120° F. while continuously stirring. [Instead of this heating step, a floccing agent such as aluminum nitrate (Al(NO$_3$)$_3$) could have been added to cause the solids of floc]. The flocced mixture is then filtered through a large stainless crock to remove the bulk of the liquids; the wet floc is then dried in a tray in a preheated 250° F. oven. The caked floc solids are then pulverized to as fine a particle size as possible. The floc particles are agglomerates of carbon and PIFE.

The smaller the particles, the easier it is to suspend them and keep them suspended in the ink. A maximum particle size of about ten microns is suggested although somewhat larger particles may produce satisfactory results in certain situations. We have used a Bantam Mikro-Pulverizer manufactured by Pulverizing Machinery Division of Mikropul Company of Summit, N.J. to convert the floc to a fine powder. Best results can be obtained by using a Jet-O-Mizer manufactured by Fluid Energy Processing of Hatfield, PA. and more fully described in commonly owned copending application U.S. Ser. No. 920,035 titled "Catalytic Material for Fuel Cell Electrodes" by R. Singer filed on even date herewith.

Although in this preferred embodiment PTFE is used as the hydrophobic polymer, other hydrophobic fluorocarbon polymers compatible with the cell environment, such as fluoroethylene propylene (FEP) may also be suitable.

Ink Preparation

The oxidized, dry powdered floc is slowly added stepwise to a 50/50 solution of ethylene glycol and glycerine, blending to a smooth consistency after each addition, until a 14–18% by weight total solids ink is obtained. For example, 8 g of the dry floc powder is added to 100 g of a 50/50 glycol/glycerine solvent and blended to suspend the floc. An additional 8 g is added and blended. Six more grams is added and blended to a smooth fluid consistency, which in this instance is like chocolate syrup. Any inking vehicle which can be essentially completely removed is suitable for use with the present invention. In addition to ethylene glycol/glycerine, some other possible inking vehicles are pure glycerine, pure glycol or other dibasic or tribasic alcohols.

Screen Printing the Ink

Standard screen printing techniques are then used to apply the ink to the carbon paper substrate. The following is an example of a preferred procedure: (1) the dry floc ink described above is printed through a 40 mesh silk or Nitex or stainless steel screen onto the above described substrate by buttering the screen with a stainless steel spatula using a firm, even scrapping pressure. (2) Excess ink is then removed from the screen with a hard rubber based squeegee in one firm pass. (3) The buttering and excess ink removal steps are repeated once. (4) The screen is then removed and the substrate dried in a preheated, ventilated, 350° F. oven until all the ink solvent has been evaporated. The printing procedure (Steps 1 through 4) is repeated until the desired loading is obtained. Using the ink described above, twice through the procedure yields a loading of approximatey 3.25 mg/cm$^2$ Vulcite which was our desired loading. Loadings between 1.0 and 6.0 mg/cm$^2$ would probably also yield satisfactory electrodes.

Further Treatment of the Dry Floc Layer

The following procedure is an exemplary method for finishing the electrode. Other know methods may be used.

The applied dry floc sublayer is then covered with brown paper and the partially finished electrode is compacted between plates at 200 psi or between rollers at an equivalent pressure. The brown paper is removed and the electrode is sintered by heating at 640° F. for 20 minutes. It is then preferably compacted again at 200 psi. The electrode is now ready for catalyzation by any known technique, such as the method described in commonly owned U.S. Pat. No. 3,932,197 or 3,979,227, both by Katz et al., which are incorporated herein by reference. The following table presents comparative initial performance data for electrodes made by the above-described method (A) and prior art electrodes made by applying the above-described floc to the same substrate by spraying (B). All the electrodes had substantially the same platinum catalyst loading of about 0.60 mg/cm$^2$. It should be noted the sprayed electrodes were not catalyzed by the same technique as the screen printed electrodes; however, it is not believed that this results in any significant performance differences between the two.

| TYPICAL INITIAL ELECTRODE PERFORMANCE | | | | |
|---|---|---|---|---|
| | | Cell Voltage (Volts) | | |
| Electrode | Reactants | 100 amps/ft$^2$ | 200 amps/ft$^2$ | 300 amps/ft$^2$ |
| A | H$_2$, Air | .691 | .637 | .608 |
| B | H$_2$, Air | .672 | .621 | .580 |

These reults show that the low cost method of the present invention can produce electrodes with initial performance levels as a good as prior art electrodes. In addition to obtaining good performance, we printed uniform electrodes by the method of the present invention at a rate of about 25 per hour in a continuous operation.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A method for making an electrochemical cell electrode comprising the steps of:
   floccing a co-suspension of carbon particles and hydrophobic fluorocarbon polymer particles;
   drying the floc so produced and reducing it to a powder;
   resuspending the floc powder in an inking vehicle to form an ink;
   screen printing the ink onto a porous substrate to form a layer;
   drying the layer to remove the inking vehicle;
   compacting the layer;
   sintering the compacted layer; and
   catalyzing the layer.
2. The method according to claim 1 wherein the substrate is carbon.
3. The method according to claim 1 whrein the hydrophobic polymer is PTFE.
4. The method according to claim 1 wherein the step of reducing the floc to a powder includes reducing the floc to a particle size of less than about ten microns in diameter.
5. The method according to claim 1 wherein the step of floccing comprises blending isopropanol, distilled water, and aqueous suspension of PTFE, and carbon powder to form a uniform co-suspension of carbon powder and PTFE, and causing the solids in said co-suspension to floc.
6. The method according to claim 3 wherein the weight percent of solids in the printed ink is 14–18%.
7. The method according to claim 6 wherein the inking vehicle is one of the following liquids or combinations thereof: ethylene glycol, glycerin, dibasic alcohols, and tribasic alcohols.
8. The method for making an electrochemical cell electrode according to claim 1 wherein the hydrophobic polymer is PTFE; the inking vehicle is one of the following liquids or combinations thereof: ethylene glycol, glycerin, a dibasic alcohol and tribasic alcohols; the substrate is porous carbon; and the step of reducing the floc to a powder includes reducing the floc to a particle size of less than about ten microns.

9. A method for making an electrochemical call electrode using a powder made by floccing a co-suspension of carbon particles and hydrophobic fluorocarbon polymer particles, drying the floc so-produced and reducing it to a powder, comprising the steps of:

suspending the floc powder in an inking vehicle to form an ink;

screen printing the ink onto a porous substrate to form a layer;

drying the layer to remove the inking vehicle; compacting the layer;

sintering the compacted layer; and, catalyzing the layer.

10. The method according to claim 9 wherein the polymer is PTFE and the dry floc powder has a particle size of less than about ten microns.

* * * * *

UNITED STATES PATENT AND TRADEMARK OFFICE
CERTIFICATE OF CORRECTION

PATENT NO. : 4,185,131
DATED : January 22, 1980
INVENTOR(S) : Glen J. Goller; Vincent J. Petraglia and George Dews It is certified that error appears in the above-identified patent and that said Letters Patent are hereby corrected as shown below:

Column 3, line 27: "step" should read --steps--

Column 4, line 43: "of" should read --to--

Column 4, line 48: "PIFE" should read --PTFE--

Column 5, line 38: "approximatey" should read --approximately--

Column 5, line 45: "know" should read --known--

Column 6, line 12: after "as" (first occurrence), delete --a--

Signed and Sealed this

Twenty-ninth Day of April 1980

[SEAL]

Attest:

SIDNEY A. DIAMOND

Attesting Officer

Commissioner of Patents and Trademarks